(12) United States Patent
Kirschner

(10) Patent No.: US 6,508,441 B1
(45) Date of Patent: Jan. 21, 2003

(54) SWAY BRACE

(75) Inventor: Kraig A. Kirschner, Corona, CA (US)

(73) Assignee: Automatic Fire Control Incorporated, South El Monte, CA (US)

( * ) Notice: Subject to any disclaimer, the term of this patent is extended or adjusted under 35 U.S.C. 154(b) by 0 days.

(21) Appl. No.: 09/935,500

(22) Filed: Aug. 23, 2001

(51) Int. Cl.[7] .......................... E21F 17/02; F16L 3/00; F16L 3/24
(52) U.S. Cl. .......................... 248/62; 248/49; 248/58; 248/72
(58) Field of Search .......................... 248/49, 58, 62, 248/72, 56, 65

(56) References Cited

U.S. PATENT DOCUMENTS

| | | | | |
|---|---|---|---|---|
| 1,579,419 A | * | 4/1926 | Tomkinson | 248/62 |
| 1,582,358 A | * | 4/1926 | Tomkinson | 248/62 |
| 3,051,424 A | * | 8/1962 | Duhamel | 248/62 |
| 3,233,850 A | * | 2/1966 | Merker | 248/49 |
| 3,570,794 A | * | 3/1971 | Kirschner | 248/74 |
| 4,166,600 A | * | 9/1979 | Perjes | 248/59 |
| 4,199,070 A | * | 4/1980 | Magnussen | 211/60 |
| 4,697,770 A | * | 10/1987 | Kirschner | 248/62 |
| 4,714,218 A | * | 12/1987 | Hungerford | 248/62 |
| 5,004,193 A | * | 4/1991 | Kirschner | 248/59 |
| 5,007,603 A | * | 4/1991 | Kirschner | 248/59 |
| 5,083,216 A | * | 1/1992 | Roth | 248/62 |
| 6,273,372 B1 | * | 8/2001 | Heath | 248/62 |

FOREIGN PATENT DOCUMENTS

| | | | |
|---|---|---|---|
| GB | 2047378 | * | 11/1980 |

\* cited by examiner

Primary Examiner—Leslie A. Braun
Assistant Examiner—Amy J. Sterling
(74) Attorney, Agent, or Firm—Fulbright & Jaworski L.L.P.

(57) ABSTRACT

A sway brace including a U-shaped strap and mounting fixtures associated with the ends of the U-shaped strap. The strap includes flanges extending from the ends to threadably receive set screws. The mounting fixtures include sidewalls through which holes extend. A tie may extend through the mounting fixtures and be fixed thereto by the set screws binding the pipe against the mounting fixture holes. A bracket coupled with the pipe may be bolted to a structural member to retain the entire assembly from swaying.

32 Claims, 2 Drawing Sheets

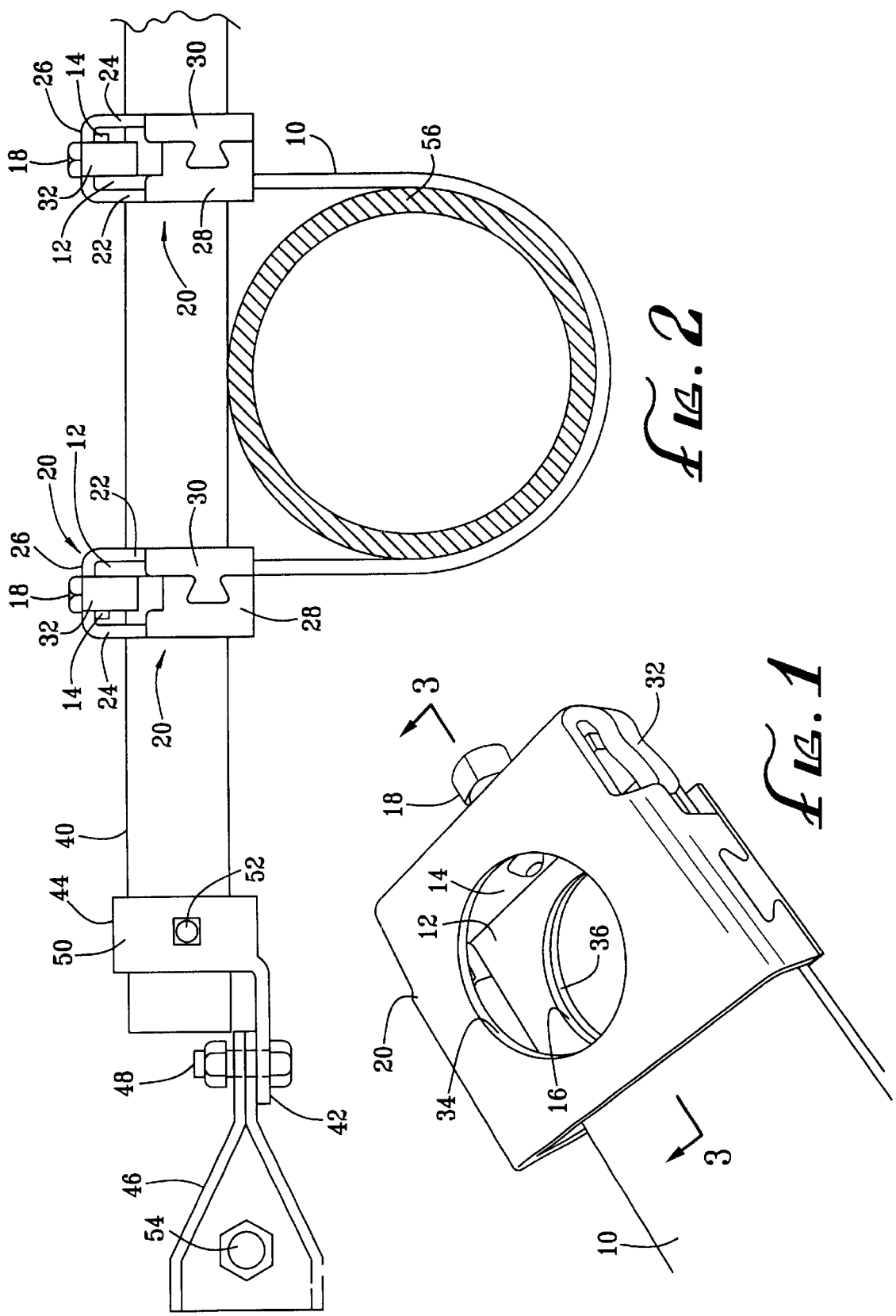

SWAY BRACE

BACKGROUND OF THE INVENTION

The field of the present invention is bracing for use in building structures for utility lines.

Building codes, as well as competent construction practice, require the securing of fluid lines and other utilities to the structure of a building to brace such lines against damaging movement resulting from seismic disturbances. Sway braces have been designed for securing numerous types of fluid supply lines. An example of such secured lines is fire control water sprinkler distribution pipes. When sprinkler systems are used in buildings, it is required that the water distribution pipes be adequately braced so that, in the event of an earthquake, the pipes will not unduly sway relative to adjacent portions of the building and separate or produce excessive leakage at the pipe joints.

Various types of sway brace structures have been developed for this purpose. Examples of such brace designs are to be found in U.S. Pat. Nos. 4,697,770 and 3,570,794.

SUMMARY OF THE INVENTION

The present invention is directed to a sway brace employing a U-shaped strap and mounting fixtures to securely mount the strap to a tie, which may be, in turn, attached to a building structure. The U-shaped strap is able to receive a pipe or other utility line.

In a first separate aspect of the present invention, the mounting fixtures include two bearing surfaces facing in a first direction and a second bearing surface facing in the opposite direction. The ends of the U-shaped strap extend to between the first two bearing surfaces and face the second bearing surface. A set screw threadably engages the ends of the strap and extends toward the two bearing surfaces. The sway brace is able to accommodate a tie positioned between the two bearing surfaces and the set screw to create a stable and rigid attachment for the U-shaped strap through each of the mounting fixtures.

In a second separate aspect of the present invention, the first separate aspect is further defined by the bearing surfaces being holes through two sidewalls in each of the mounting fixtures, the sidewalls having substantially coincident centerlines. The opposed bearing surface may be a top of the mounting fixture extending between the two sidewalls. In this way, the mounting fixtures fully capture the tie which may be a structural element or pipe.

In a third separate aspect of the present invention, a sway brace includes a U-shaped strap and mounting fixtures associated with each end of the strap. The mounting fixtures each include two sidewalls having holes therethrough and a top extending between the sidewalls. Set screws are threadably mounted to the ends of the U-shaped strap and directed toward the centerlines for the holes through the sidewalls. A tie may extend through the holes to be secured against the edges of the holes by the set screws.

In a fourth separate aspect of the present invention, any of the foregoing separate aspects are contemplated to be employed to mutual advantage.

Accordingly, it is an object of the present invention to provide an improved sway brace. Other and further objects and advantages will appear hereinafter.

BRIEF DESCRIPTION OF THE DRAWINGS

FIG. 1 is a perspective view of a mounting fixture at one end of a U-shaped strap.

FIG. 2 is a side view of a sway brace with an associated tie and a supported pipe, the pipe being in cross section.

DETAILED DESCRIPTION OF THE PREFERRED EMBODIMENT

Figure 3:
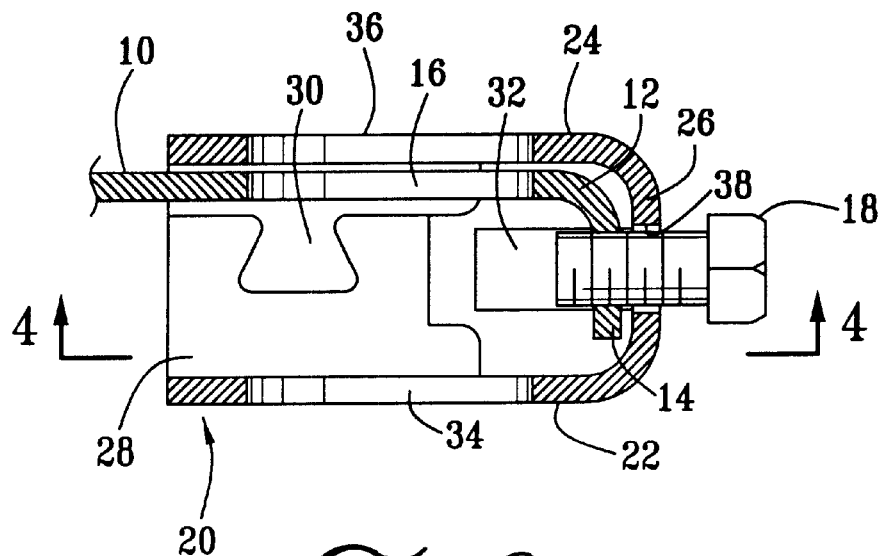
FIG. 3 is a cross-sectional view taken along line 3—3 of FIG. 1.
Figure 4:
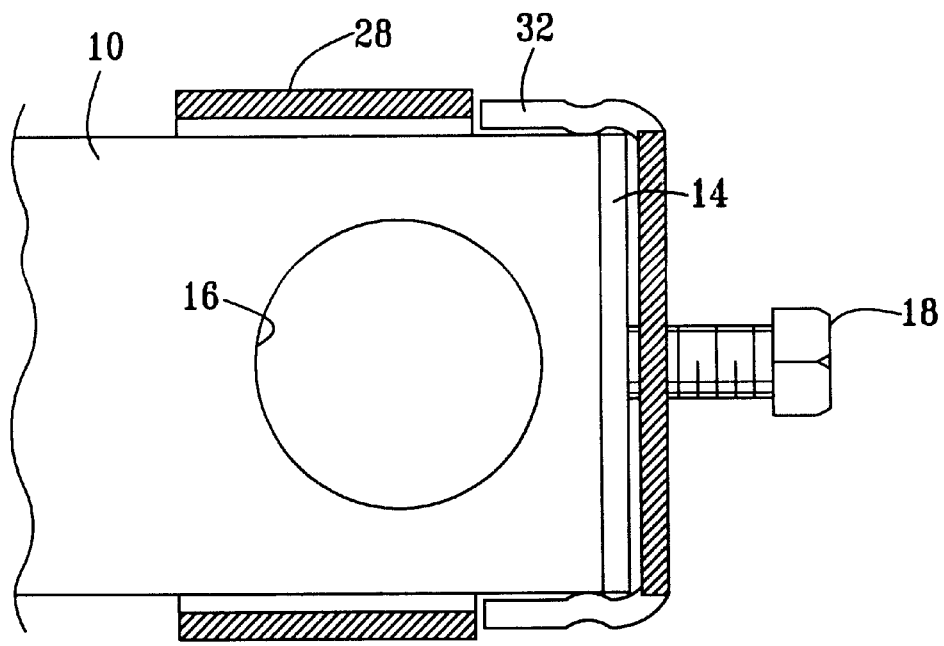
FIG. 4 is a cross-sectional view taken alone line 4—4 of FIG. 3.

Turning in detail to the figures, a sway brace is illustrated having a U-shaped strap 10. The strap extends to two ends 12 which include outwardly extending flanges 14. An access hole 16 is located at each end 12 of the U-shaped strap 10 to accommodate a tie to which the brace is associated. The flanges 14 each include a set screw 18 threadably associated therewith. Each end 12 of the strap 10 receives a mounting fixture 20. Each mounting fixture 20 is defined by two sidewalls 22 and 24. These walls 22 and 24 are roughly parallel and displaced from one another to allow insertion of the ends 12 of the strap 10 with the flanges 14 between the two walls. A top 26 extends between the two walls 22 and 24 and each of the sidewalls 22 and 24 includes fixture ends 28 and 30 which extend toward one another and interlock as can best be seen in FIG. 1. Clips 32 extend toward the fixture ends 28 and 30 from the top 26. The mounting fixture 20 forming these several components is fabricated from a single sheet of steel.

Holes 34 and 36 extend through the sidewalls 22 and 24 and have substantially coincident centerlines. The holes 34 and 36 are shown to be round. The portion of the edges of these holes 34 and 36 most distant from the top 26 provide bearing surfaces as will be discussed. The holes 34 and 36 are also substantially aligned with the access holes 16 of the strap 10. With the mounting fixtures 20 in place over the strap ends 12, the flanges 14 are captured by the clips 32 which loosely retain the ends 12 of the strap 10 in place. Further, the flanges 14 face the tops 26 with each top 26 becoming a further bearing surface against which the flanges 14 are pressed. A hole 38 through each top 26 provides access for the shafts of the set screws 18 such that each screw 18 is both threadably engaged with one of the flanges 14 and extends above one of the tops 26 so that it can be accessed for forced rotation.

A pipe 40 forms a tie extending through the holes 34 and 36. The pipe 40 also extends through the access hole 16. A bracket 42 is associated with one end of the pipe 40. The bracket 42 is defined by two elements 44 and 46 with a pinned coupling 48 provided by a bolt and nut. The element 44 includes a first attachment which is shown to be a pipe collar 50 that is positioned about the pipe 40. A set screw 52 retains the collar 50 on the pipe 40. The element 56 has a second attachment which is a bolt hole to receive a bolt and nut 54. The bolt hole has an access which is perpendicular to the pinned coupling 48 for maximum mounting flexibility.

Referring principally to FIG. 2, the sway brace is installed by placing the U-shaped strap 10 around a pipe 56 which is to be constrained. The tie 40 is then threaded into the holes 34 and 36 as well as the access holes 16. The set screws 18 are tightened onto the tie pipe 40. As the set screws 18 extend toward the centerlines of the holes 34 and 36, their advancement against the pipe 40 will force the pipe against the bearing surfaces defined by the edges of the holes 34 and 36. As this is occurring, the flanges 14 move upwardly to bear against the bearing surface defined by the underside of the tops 26. Thus, each mounting fixture is able to grip the pipe 40 by the set screws associated with the straps and by the bearing surfaces associated with the sidewalls 22 and 24 to either side of the strap 10. The bracket 42 is appropriately assembled with the pipe 40 and the bolt and nut 54 fixed to a structural member of the building.

Accordingly, an approved sway brace has been shown and described. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A sway brace comprising
   a U-shaped strap including two ends;
   mounting fixtures, each mounting fixture including two first bearing surfaces facing in a first direction and a second bearing surface facing in a second direction opposite to the first direction and facing the two first bearing surfaces, each end of the U-shaped strap extending to face the second bearing surface and to between the two first bearing surfaces, respectively;
   set screws threadably engaging the ends to extend toward the two first bearing surfaces.

2. The sway brace of claim 1, the two ends of the U-shaped strap including flanges extending normally from the U-shaped strap.

3. The sway brace of claim 2, the set screws threadably extending through the flanges, respectively.

4. The sway brace of claim 2, the flanges extending away from one another.

5. A sway brace comprising
   a U-shaped strap including two ends;
   mounting fixtures, each mounting fixture including two first bearing surfaces facing in a first direction and a second bearing surface facing in a second direction opposite to the first direction, each end of the U-shaped strap extending to face the second bearing surface and to between the two first bearing surfaces, respectively;
   set screws threadably engaging the ends to extend toward the two first bearing surfaces, the mounting fixtures each including two side walls, each side wall having a hole therethrough, the holes having substantially coincident centerlines and one portion of each of the holes forming one of the first bearing surfaces.

6. The sway brace of claim 5, the mounting fixtures each further including a top extending between the two side walls, each top forming the second bearing surface.

7. The sway brace of claim 6, each end of the U-shaped strap including an access hole therethrough with the holes of the sidewalls being generally aligned with the access holes with the ends extending to between the two side walls of the mounting fixtures and facing the tops, respectively.

8. The sway brace of claim 5, the side walls of each mounting fixture each having fixture ends which extend toward and interlock with the fixture ends of the other side wall.

9. The sway brace of claim 5, the mounting fixtures each further including clips loosely engaging the flange positioned between the two side walls of the mounting fixture.

10. A sway brace comprising
    a U-shaped strap including two ends;
    mounting fixtures, each mounting fixture including two first bearing surfaces facing in a first direction and a second bearing surface facing in a second direction opposite to the first direction, each end of the U-shaped strap extending to face the second bearing surface and to between the two first bearing surfaces, respectively;
    set screws threadably engaging the ends to extend toward the two first bearing surfaces;
    a tie extending across the two first bearing surfaces of each mounting fixture, the set screws extendable to engage the tie.

11. The sway brace of claim 10 further comprising
    a bracket including a first element having a first attachment, a second element having a second attachment and a pinned coupling between the first and second elements, the first element being affixed to the tie.

12. The sway brace of claim 11, the tie being a pipe and the first attachment being a pipe collar having a collar set screw.

13. The sway brace of claim 12, the holes of the side walls being round.

14. The sway brace of claim 13, the second attachment having a bolt hole therethrough with an axis perpendicular the pinned coupling.

15. The sway brace of claim 13, the pipe forcefully engaging the first bearing surfaces with the set screw forcefully engaging the pipe.

16. A sway brace comprising
    a U-shaped strap including two ends, flanges extending normally from the U-shaped strap at the ends thereof and first holes through the strap adjacent the ends thereof;
    mounting fixtures each including two displaced side walls, each side wall having a second hole therethrough, the second holes having coincident centerlines, and a top extending between the two parallel and displaced side walls, each end of the U-shaped strap extending to between the two side walls of the mounting fixtures, respectively, to generally align the first and second holes;
    set screws threadably extending through the flanges, respectively, to extend toward the coincident centerlines of the second holes.

17. The sway brace of claim 16, the flanges extending away from one another.

18. The sway brace of claim 16, the displaced side walls of each mounting fixture each having fixture ends which extend toward and interlock with the fixture ends of the other displaced side wall.

19. The sway brace of claim 16, the mounting fixtures each further including clips loosely engaging the flange positioned between the two side walls of the mounting fixture.

20. The sway brace of claim 16 further comprising
    a tie extending through the first and second holes, the set screws extendable to engage the tie.

21. The sway brace of claim 20 further comprising
    a bracket including a first element having a first attachment, a second element having a second attachment and a pinned coupling between the first and second elements, the first element being affixed to the tie.

22. The sway brace of claim 21, the tie being a pipe and the first attachment being a pipe collar having a collar set screw.

23. The sway brace of claim 22, the second holes being round.

24. The sway brace of claim 23, the second attachment having a bolt hole therethrough with an axis perpendicular the pinned coupling.

25. The sway brace of claim 23, the pipe forcefully engaging the periphery of the second holes with the set screw forcefully engaging the pipe.

26. A sway brace comprising
- a U-shaped strap including two ends, flanges extending normally from the Ushaped strap at the ends thereof and first holes through the strap adjacent the ends thereof;
- mounting fixtures each including two side walls, each side wall having a second hole therethrough, the second holes having coincident centerlines, and a top extending between the two side walls, each end of the U-shaped strap extending to between the two side walls of the mounting fixtures, respectively, to generally align the first and second holes;
- set screws threadably extending through the flanges, respectively, to extend toward the coincident centerlines of the second holes;
- a tie extending through the first and second holes, the set screws extendable to engage the tie, the tie forcefully engaging the periphery of the second holes with the set screw forcefully engaging the tie.

27. The sway brace of claim 26, the tie being a pipe.

28. The sway brace of claim 27, the second holes being round.

29. The sway brace of claim 26 further comprising
- a bracket including a first element having first attachment, a second element having a second attachment and a pinned coupling between the first and second elements, the first element being affixed to the tie.

30. The sway brace of claim 29, the tie being a pipe and the first attachment being a pipe collar having a collar set screw.

31. The sway brace of claim 29, the second attachment having a bolt hole therethrough with an axis perpendicular the pinned coupling.

32. A sway brace comprising
- a U-shaped strap including two ends, flanges extending normally from the Ushaped strap at the ends thereof and first holes through the strap adjacent the ends thereof;
- mounting fixtures each including two side walls, each side wall having a second, round hole therethrough, the second, round holes having coincident centerlines, and a top extending between the two side walls, each end of the U-shaped strap extending to between the two side walls of the mounting fixtures, respectively, to generally align the first and second holes;
- set screws threadably extending through the flanges, respectively, to extend toward the coincident centerlines of the second holes;
- a pipe extending through the first and second holes, the set screws extendable to engage the pipe, the pipe forcefully engaging the periphery of the second holes with the set screw forcefully engaging the pipe;
- a bracket including a first element having pipe collar with a collar set screw, a second element having an attachment having a bolt hole therethrough with an axis and a pinned coupling between the first and second elements, the first element being affixed to the pipe, the axis of the bolt hole being perpendicular to the pinned coupling.

\* \* \* \* \*